United States Patent
Guo et al.

(10) Patent No.: US 8,282,277 B2
(45) Date of Patent: Oct. 9, 2012

(54) REPLACEABLE PROBE HOLDER STRUCTURE FOR THERMOMETER

(75) Inventors: Chuanxi Guo, Nanshan Shenzhen (CN); Anqiang Liao, Nanshan Shenzhen (CN)

(73) Assignee: Edan Instruments, Inc. (CN)

( * ) Notice: Subject to any disclaimer, the term of this patent is extended or adjusted under 35 U.S.C. 154(b) by 536 days.

(21) Appl. No.: 12/505,790

(22) Filed: Jul. 20, 2009

(65) Prior Publication Data

US 2011/0013671 A1    Jan. 20, 2011

(51) Int. Cl.
*G01K 1/14* (2006.01)

(52) U.S. Cl. ........ 374/208; 374/200; 374/198; 374/163; 374/120; 73/866.5

(58) Field of Classification Search ................ 374/163, 374/208, 100, 198–200, 179, 120, 121, 141; 600/474, 549; 73/866.5
See application file for complete search history.

(56) References Cited

U.S. PATENT DOCUMENTS

| | | | | |
|---|---|---|---|---|
| 1,406,373 A * | 2/1922 | Greeley | ......................... | 206/212 |
| 2,875,614 A * | 3/1959 | Dobrin et al. | ................. | 374/203 |
| 2,967,428 A * | 1/1961 | Burgert | ......................... | 374/155 |
| 3,474,658 A * | 10/1969 | Levy et al. | ...................... | 374/56 |
| 3,526,123 A * | 9/1970 | Brecher et al. | .................. | 374/30 |
| 4,061,226 A * | 12/1977 | Essen | ............................. | 206/306 |
| 4,083,250 A * | 4/1978 | Goff et al. | ...................... | 374/155 |
| 4,355,912 A * | 10/1982 | Haak | .............................. | 374/208 |
| 5,458,121 A * | 10/1995 | Harada | .......................... | 600/474 |
| 6,142,297 A * | 11/2000 | Price | ............................. | 206/212 |
| 6,220,749 B1* | 4/2001 | Wyker | .......................... | 374/141 |
| 6,827,488 B2* | 12/2004 | Knieriem et al. | ............. | 374/209 |
| 8,123,402 B2* | 2/2012 | Li | ................................. | 374/158 |
| 8,162,537 B2* | 4/2012 | Ma et al. | ........................ | 374/158 |
| 2004/0071188 A1* | 4/2004 | Knieriem et al. | ............. | 374/163 |
| 2006/0203878 A1* | 9/2006 | Pearl et al. | ..................... | 374/141 |
| 2008/0295575 A1* | 12/2008 | Tokuyasu et al. | ............ | 73/23.31 |

* cited by examiner

*Primary Examiner* — Gail Verbitsky
(74) *Attorney, Agent, or Firm* — Garcia-Zamor IP Law; Ruy M. Garcia-Zamor

(57) ABSTRACT

The invention discloses a replaceable probe holder structure for thermometer, including a thermometer shell. Inside the thermometer shell installs a slot and an elastic positioning mechanism; inside the slot installs a probe holder; after the insertion of the probe holder in the slot, the probe holder will match with the elastic positioning mechanism and then fixed in the slot. By adopting the above structure, the probe holder structure of this invention requires fewer components, and convenient for installation; the adoption of the elastic positioning mechanism to fix the probe holder is more convenient to replace in practical use.

3 Claims, 3 Drawing Sheets

REPLACEABLE PROBE HOLDER STRUCTURE FOR THERMOMETER

TECHNICAL FIELD

The invention relates to a thermometer, especially refers to a replaceable probe holder structure to be applied to the electronic thermometer.

BACKGROUND ART

Because the mercury thermometer are made of glass materials, it is very easy to break during use, which causes the leakage of mercury, so that the mercury thermometers has potential harm to the environment, patients and medical personnel which could not be ignored. The electronic thermometers do not use the mercury, the readings are straightforward, and it could be applied to use for measurement in multiple sites such as oral cavity, armpit and rectum and so on. The common electronic thermometer is composed by electronic thermometer host, body temperature probe and probe holder; the probe connects with the electronic thermometer host by wires, and the probe holder adopts a removable structure that installed in the host, and when the probe is not in use, it will be placed on the probe holder. If the infected probe is return back to the probe holder, it will cause the infection to the probe holder, so by using the replaceable probe and probe holder structure will bring convenience in practical use.

CONTENTS OF THE INVENTION

Aiming at the shortcomings above in existing technology, this invention is to provide a replaceable probe holder structure for electronic thermometer, which requires fewer components, and with simple structure, and more convenient for installation and use.

To achieve the objective above, this invention adopts the following technical solution:

A replaceable probe holder structure for thermometer, including a thermometer shell, and its feature is that inside the thermometer shell installs a slot and an elastic positioning mechanism; inside the slot installs a probe holder; after the insertion of the probe holder in the slot, the probe holder will match with the elastic positioning mechanism and then fixed in the slot.

Inside the foresaid thermometer shell locates a cavity with an opening in the upper end, and after the installation of the cavity and a fixing cover forms a slot; inside the thermometer shell has a spacing groove, and after the elastic positioning mechanism is fixed in the spacing groove, the resilient contact of the elastic positioning mechanism run through with the slot.

The foresaid elastic positioning mechanism includes a hollow cylinder with screw thread in the surface and a screw cap with a card hole; the installation of the hollow cylinder and the screw cap forms a body, where inside the body installs an elastic device and a sphere body, and with the coordination of the elastic device and the body, a part of the sphere body is restricted outside the card hole.

The foresaid external diameter of the sphere body is slightly larger than the card hole in the screw cap; the coordination of the elastic device and the body forms the resilient contact.

Both sides of the foresaid probe holder uses the plane structure, which enable it to be inserted into the slot of the thermometer shell in a certain angle or the rotation angle of 180 degrees; each plane structure of both sides has a spacing point, after the probe holder is inserted into the proper depth in the slot, the spacing point and the foresaid resilient contact outside the card hole of the elastic positioning mechanism will coordinate and fix the probe holder in the inside of the slot.

By adopting the above structure, the probe holder structure of this invention requires fewer components, and convenient for installation; the adoption of the elastic positioning mechanism to fix the probe holder is more convenient to replace in practical use.

MODE OF CARRYING OUT THE INVENTION

Figure 1:
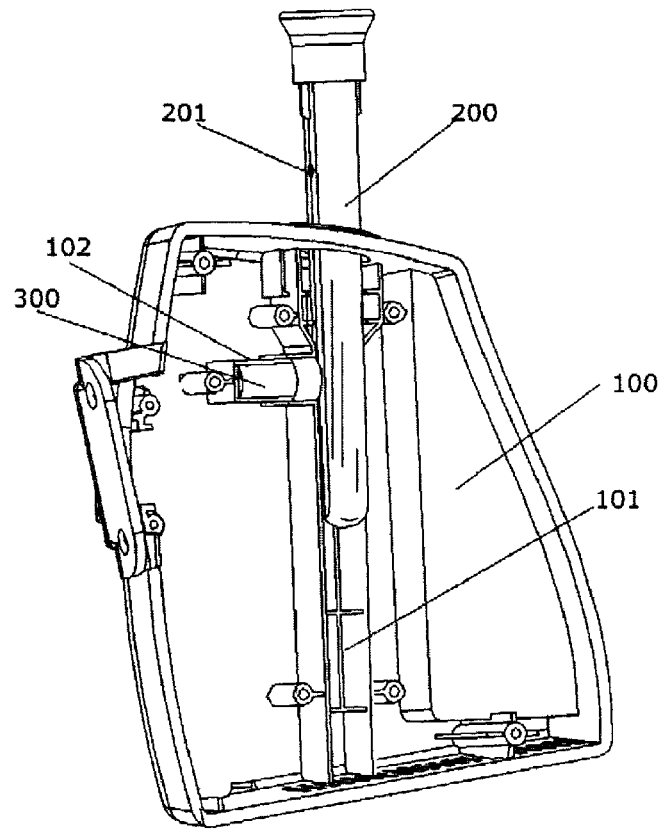
FIG. 1 is the figure for the replacement of the probe holder of the mode of the implementation of the invention.
Figure 2:
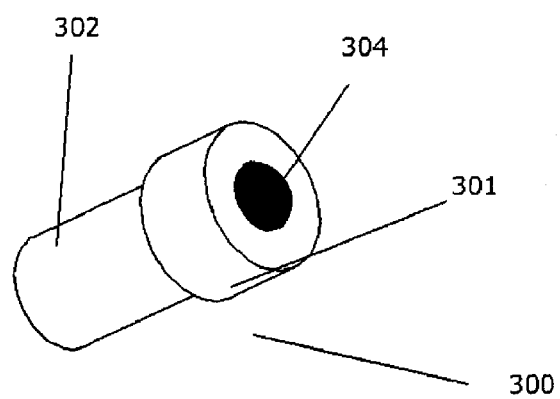
FIG. 2 is the structure figure of the positioning mechanism of the implementation mode of the invention
Figure 3:
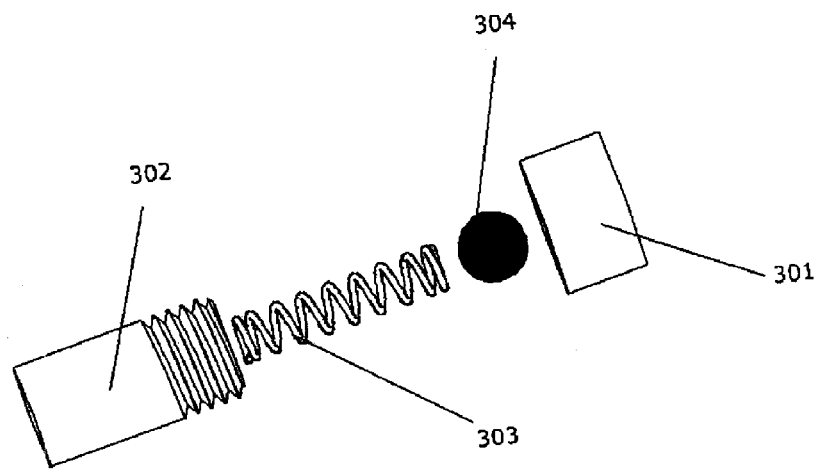
FIG. 3 is the exploded figure of the FIG. 2.
Figure 4:
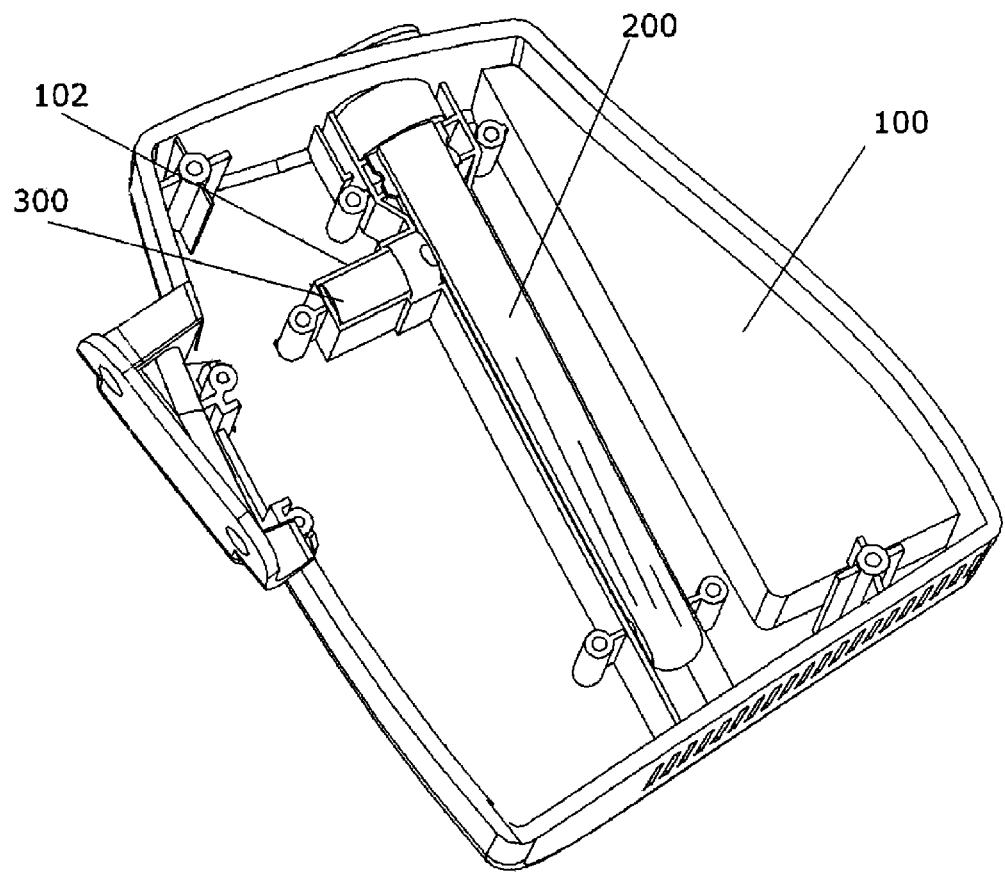
FIG. 4 is the figure of the localization of the probe holder of the implementation mode of the invention
Figure 5:
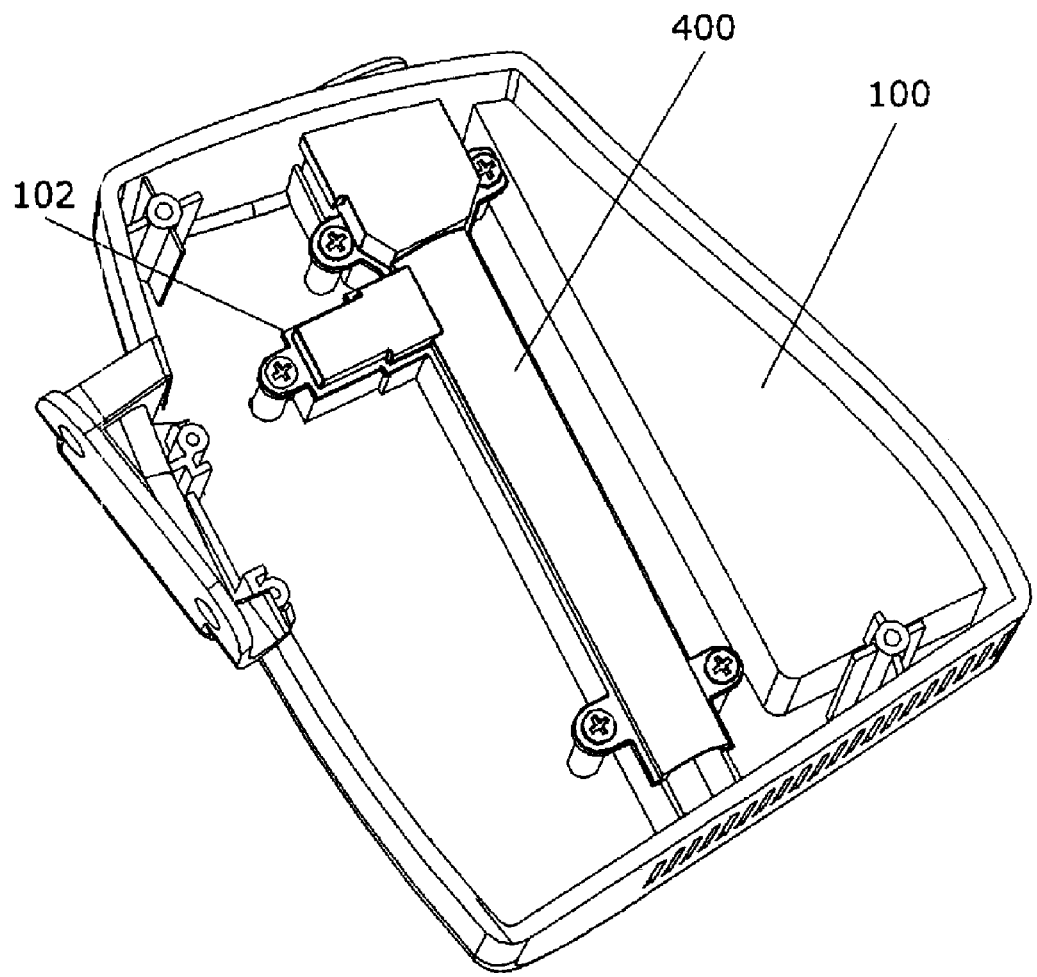
FIG. 5 is the figure after the installation of the fixing cover of the implementation mode of the invention

Further explanation to the invention will be stated below combining with the attached figures and the mode of carrying out the invention:

As shown in FIG. 1 is a replaceable probe holder structure for thermometer, including a thermometer shell 100, an elastic position mechanism 300, and a probe holder 200; wherein inside the thermometer shell 100 has a notch with a shape of cavity, as shown in FIG. 5, the notch and the fixing cover 400 composed of the slot 101 which is for the placement of the probe holder 200; both sides of the probe holder 200 uses the plane structure, and there is a small space after the insertion of the probe holder 200 into the slot 101. Inside the thermometer shell 100 has a spacing groove 102, and after the elastic positioning mechanism 300 is fixed in the spacing groove 102, the sphere body 304 of resilient contact in the elastic positioning mechanism 300 runs through with the slot 101. As shown in FIG. 4, after the probe holder 200 is fully inserted into the slot 101, the sphere body 304 will fix the probe holder 200 in the spacing point 201.

Wherein the elastic positioning mechanism 300, as shown in FIG. 2 and FIG. 3, whose body is composed by a hollow cylinder 302 with screw thread in the surface and a screw cap 301. The screw cap 301 installs with the cylinder 302 by screw thread, and the screw cap 301 has a card hole. Inside the body installs an elastic device 303 and a sphere body 304, and with the coordination of the elastic device 303 and the body, a part of the sphere body 304 is restricted outside the card hole. The sphere body 304 is able to move an axial direction along with the elastic device 303 by force; and the screwing of the screw cap 301 could adjust the amounts of stretch of the elastic device.

As shown in FIG. 1, the plug and pull of the probe holder 200 will triggers the elastic movement of the sphere body 304 of the positioning mechanism 300. When the probe holder 200 is full inserted into the inside of the thermometer shell 100, as shown in FIG. 4, the sphere body 304 will locates in the spacing point 201 of the probe holder 200 under the effect of the elastic device 303, which realizes the function for localization. When we need to replace the probe holder, we just need a slightly force to pull out the probe holder 200 upward, and the spacing point 201 will detach from the effect of the sphere body 304 of the positioning mechanism 300, so that we could pull out the probe holder. The tightness could be adjusted by whirling the screw cap 301 to adjust the elasticity of the positioning mechanism 300, which could achieve a better effect.

The basic idea of the invention lies in the localization of the probe holder by using the elastic device, with an adjustable tightness, and it is simple structure, and convenient to install and use. The implementation of the invention, is not merely limited to the above disclosed implementation mode, any theory that based on the above, with slightly changes or identical alternations are within the range of the scopes of protection of the patent.

The invention claimed is:

1. A replaceable probe holder structure for a thermometer, comprising:
    a thermometer shell, the thermometer shell defining a slot therein configured to receive a probe holder;
    an elastic positioning mechanism located inside the thermometer shell proximate the slot and adapted to engage the probe holder located within the slot, wherein the elastic positioning mechanism comprises a hollow cylinder with screw thread in the surface and a screw cap defining a card hole therein; wherein securing of the hollow cylinder to the screw cap forms a body; inside the body is positioned an elastic device and a sphere body; the elastic device is configured to drive a part of the sphere body through the card hole while securing the sphere body against the screw cap;
    the probe holder located in the slot, wherein after the probe holder is inserted into the slot, the probe holder is engaged by the elastic positioning mechanism to secure the probe holder in the slot.

2. In accordance with the replaceable probe holder structure for a thermometer of claim 1, wherein an external diameter of the sphere body is slightly larger than the card hole in the screw cap; the combination of the elastic device and the sphere body being configured to form a resilient contact with the probe holder when the probe holder is inserted in the slot.

3. A replaceable probe holder structure for a thermometer, comprising:
    a thermometer shell, the thermometer shell defining a slot therein configured to receive a probe holder;
    an elastic positioning mechanism located inside the thermometer shell proximate the slot and adapted to engage the probe holder located within the slot;
    the probe holder located in the slot, the probe holder having opposing sides each configured to form a plane such that the probe holder has opposing planar surfaces configured to align the probe holder with the slot wherein after the probe holder is inserted into the slot, the probe holder is engaged by the elastic positioning mechanism to secure the probe holder in the slot;
    wherein after the probe holder is inserted into a proper depth in the slot, the probe holder is secured in the slot by a resilient contact with a sphere ball which forms part of the elastic positioning mechanism to secure the probe holder in the inside of the slot.

* * * * *